(12) United States Patent
Drake

(10) Patent No.: US 6,614,631 B1
(45) Date of Patent: Sep. 2, 2003

(54) SMART TRIP TRANSFORMER

(76) Inventor: Paul A. Drake, 2344 Upper Greens Pl., Virginia Beach, VA (US) 23456

( * ) Notice: Subject to any disclaimer, the term of this patent is extended or adjusted under 35 U.S.C. 154(b) by 123 days.

(21) Appl. No.: 09/994,501

(22) Filed: Nov. 27, 2001

(51) Int. Cl.7 ................................................ H02H 5/04
(52) U.S. Cl. ...................................................... 361/23
(58) Field of Search ............................. 361/23, 24, 25, 361/78; 318/430

(56) References Cited

U.S. PATENT DOCUMENTS

| | | | | |
|---|---|---|---|---|
| 3,611,036 A | * | 10/1971 | Edson | |
| 4,150,788 A | * | 4/1979 | Matsumoto et al. | |
| 5,761,018 A | * | 6/1998 | Blakely | |

* cited by examiner

*Primary Examiner*—Edward H. Tso
(74) *Attorney, Agent, or Firm*—Troutman Sanders LLP; Gerald R. Boss, Esq.

(57) ABSTRACT

The present invention is a phase loss protector for a three phase motor supplied by a three phase power source. A three phase motor has three main power legs, L1, L2 and L3, going in. Two of the three legs power the stepdown transformer that supplies a controller. The controller ensures power does not reach the three phase motor when L3 is not operating. If L3 loses power, a controller relay will not supply power to a power coil that supplies generally open contact points, shutting down power to the three phase motor. If L1 loses power, the transformer will not provide power for the controller to operate. If L2 loses power, the transformer will not provide power to the controller and the controller relay will not supply power to the power coil, again shutting down power to the three phase motor.

10 Claims, 3 Drawing Sheets

SMART TRIP TRANSFORMER

FIELD OF INVENTION

This invention relates to control systems for three phase motors and, more particularly, to power leg loss protection for three phase motors.

BACKGROUND OF THE INVENTION

Air conditioning equipment, including compressors and fan motors, is designed to operate utilizing a three phase power supply and a controller, usually a thermostat, that will turn the equipment on and off as needed to maintain desired temperature. These types of motors are commonly known as three phase motors and are turned on and off by a control circuit powered by a stepdown transformer. In general, such control circuits contain contact points, or movable conductors, that close to complete a circuit when they receive a predetermined threshold voltage. Three phase motors are supplied by three main power "legs" (L1, L2 and L3) from a three phase power supply. Two of the main power legs also supply a control power, which is typically 24 volts, to power the control circuit. Since the control circuit operates at 24 volts, only two main power legs are needed. The stepdown transformer that generates the control power is powered by L1 and L2 and converts the higher three phase transmission voltages, usually 208, 240 or 480 volts depending on the power source, into the lower voltages necessary for powering the control circuit.

Anytime there is three phase equipment there is a risk of "single phasing". Single phasing is when one of the three legs of main power is lost due to a power company problem, electrical storm or other surge capable of overloading a main high voltage transformer that feeds a particular area. When this happens, there is little that can be done to prevent the possible burn out of equipment connected to the affected power grid. In particular, because control circuits and the stepdown transformers that power them only require two power legs to operate, power can still get to the equipment even when a particular power leg is lost especially when that particular power leg is not used to power the control circuit. This situation may result in equipment burn out. Accordingly, various systems have been developed to protect equipment in case power is terminated.

One such protection system is disclosed in U.S. Pat. No. 5,761,018 to Blakely. Blakely discloses a motor control circuit that contains logic programming for a time delayed power shut off mechanism which shuts off the electrical current flowing between a three phase power source and a motor when a fault condition is detected by circuit logic. The circuit logic prevents potentially damaging input power supplied by the three phase power source from reaching the motor by monitoring the average phase current value over time. When the fault condition is detected by the circuit logic, the motor control circuit generates a trip signal to actuate a switch which shuts off the current flow from the three phase power source, thereby preventing the three phase power from reaching the motor. Blakely discloses a time delayed power shut off mechanism because the complex circuit logic cannot shut off power immediately in the event of a leg loss. In order for the system to operate, the circuit logic has to go through the steps of monitoring the three phase power flowing into the motor for a period of time, analyzing the power flow in order to detect a fault condition and finally, if a fault condition is detected, affirmatively responding by opening the switch. Therefore, the logic circuit's detection and response cycle will result in significant time delays between the occurrence of the fault condition, the detection of the fault condition by the logic circuit and the logic circuit's response of opening the switch as a result of the fault condition to shut off the three phase power.

While the Blakely motor control circuit performs as intended, it does not monitor for the presence of all three phases of main power. Blakely requires complex circuit logic that includes a significant amount of additional components. Furthermore, the shut off time delay that is inherent in the design may be detrimental to certain applications that involve equipment that requires a higher level of power surge protection.

Blakely also discloses an overload relay circuit connected to the three legs of main power for monitoring the current flowing between the three phase power source and the motor to detect the presence of a current overload condition. When a predetermined overload condition is present, the circuit logic directs the overload relay circuit to actuate a switch that shuts down the power supply to the motor. After certain preconditions, the switch will reset to allow the current to resume flowing for a motor restart.

The overload relay circuit is not designed for shutting down power to the motor when one of the three main power legs is lost. Of particular note, the overload relay circuit is not designed to shut down power when a main power leg not used to power the stepdown transformer is lost. Therefore, the overload relay circuit is not designed for preventing a third of potential main power leg loss conditions, including surge conditions, which can have particularly damaging consequences. Similar to the operation of the motor control circuit, the overload relay circuit design incorporates a significant time delay between the occurrence of a fault condition and the logic circuit response due to complex circuit logic. The complex circuit logic and the necessity of additional circuit components introduce packaging constraints which may make the system in Blakely unsuitable for existing three phase systems and other applications that have physical space limitations.

Also, U.S. Pat. No. 3,581,179 to Jones discloses a multiphase motor control system with overcurrent and undercurrent protection. A three-phase power source supplies power to a multiphase motor via a stepdown transformer and is monitored by a control circuit for overcurrent and undercurrent conditions. When the input currents are either above a preset low level or below a preset high level, the circuit logic passes first and second control signals to the control circuit. If either the first or second control signal is not present, the circuit logic will activate a switch to shut off power to the motor.

The undercurrent or overcurrent protection design in Jones is not directly related to the loss of power from a main power leg and does not disclose a system for shutting down power to the multiphase motor when any one of the three main power legs drops out. For example, the system is not designed to detect when main power leg L3, the leg not utilized to power the stepdown transformer and control circuit, is absent. In addition, Jones, like Blakely, discloses a complex logic circuit that goes through the steps of monitoring the input phase current, analyzing the recorded data and responding to a fault condition by actuating a switch. The disadvantage of this logic cycle is that it results in significant time delays which may make the system inappropriate for applications that involve more power sensitive equipment. As in Blakely, the complex circuit logic and the necessity of additional circuit components in the Jones system create packaging constraints which may make the system in unsuitable for applications that have physical space limitations. The system may also be unsuitable for existing three phase power supply systems.

Therefore, there is a need in the art for a system that prevents power from a three phase power source from reaching a three phase motor when any of the three main power legs is lost, particularly the leg not used to power the control circuit. There is a need in the art for a control circuit that requires three main power legs to operate so it can detect all possible main power leg fault conditions, rather than fault conditions for just two main power legs. There is a need in the art for a three phase power shut off system that does not include complex circuitry nor circuit logic that inherently creates a time delay between the occurrence of a fault condition and the power shut off response. There is also a need in the art for such a system to be operable to protect sensitive three phase loads such as building air conditioning systems. In order to monitor the presence of phase current, there is a need in the art for a system dedicated to monitoring specifically for main power leg loss conditions. Finally, there is a need in the art for this system to be economically packaged and designed to be incorporated into existing three phase power supply systems and other applications that have physical space limitations without having to modify or add significant new components on to the existing stepdown transformer or any of the other existing components.

SUMMARY

The present invention overcomes the above-described problems in the prior art by providing an improvement for a three phase motor control circuit. The three phase motor control circuit includes a power coil and generally open relay contact points for preventing power from a three phase power source from reaching a load when a main power leg is not present. The three phase power source has first, second and third main power legs that power the load directly when not interrupted by a set of control circuit contact points. The operation of the control circuit contact points depends on control power flowing though the relay contact points. The control power is provided by a step down transformer which receives power from the first and second main power leg. A relay circuit includes relay contact points and a power coil which can close these relay contact points only when it receives enough power to reach a threshold voltage. The relay circuit is powered by the second and third main power legs and, therefore, is operable only when the third main power leg is present.

Accordingly, in operation, if the first main power leg loses power, the stepdown transformer coil will not provide power to the control circuit. If the second main power leg loses power, the stepdown transformer coil will not provide power to the control circuit and the relay power coil will not supply power to the power coil, thereby preventing power from getting to the control circuit. If the third main power leg loses power, the relay power coil will not supply power to the power coil thereby preventing power from getting to the control circuit. Hence, in all main power leg loss circumstances, particularly the loss of the third main power leg, the load is protected from single phasing conditions.

BRIEF DESCRIPTION OF THE DRAWINGS

The invention will be more readily understood from a reading of the following specifications and by reference to the accompanying drawings forming a part thereof, wherein an example of the invention is shown and wherein.

The construction designed to carry out the invention will hereinafter be described, together with other features thereof.

DETAILED DESCRIPTION OF THE PREFERRED EMBODIMENT

Turning now to the figures in which like numerals represent like Ace elements throughout the several views, exemplary embodiments of the present invention are described. The present invention provides a main power leg loss protection system for a load supplied by a three phase power source having three main power legs represented by L1, L2 and L3. The system constitutes a main power leg loss protection system protecting against the loss of L3. Note that while these main power legs are labeled L1, L2 and L3 for the purposes of clarity, they are interchangeable and are not necessary assigned to the specific tasks described herein. Therefore, the system can protect against the loss of any of the three main power legs, in particular the main power leg not used to power the stepdown transformer coil described below.

Figure 1:
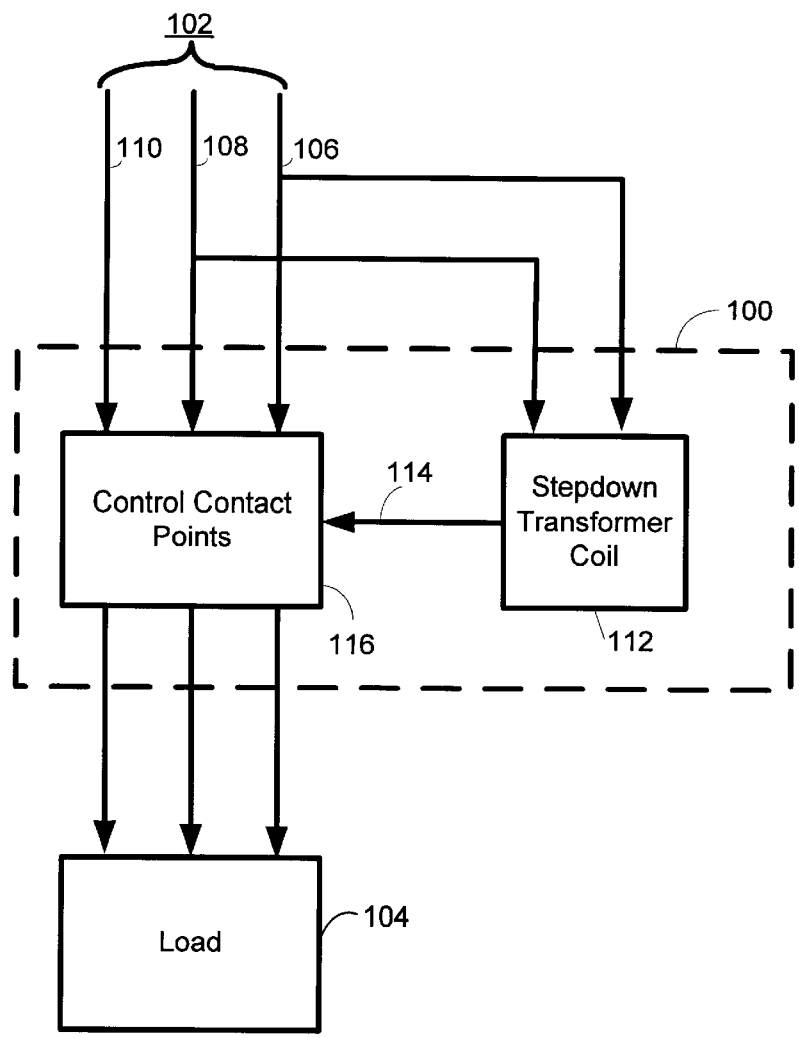
FIG. 1 is a block diagram illustrating a three phase power supply system of the prior art.

FIG. 1 is a diagram illustrating a three phase power supply system of the prior art. The key components of a three phase power system are the motor control circuit 100, the three phase power source 102 and the load 104 as shown.

The three phase power source 102, which can be a generator, power station, transformer or any other power generation medium, produces three phases of power for transmission by three main power legs known in this preferred embodiment as L1, L2 and L3, 106, 108 and 110 respectively. The three main power legs directly power the load 104 provided the motor control circuit 100 allows the supplied three phase power to pass without interruption. The three phase load 104 in this preferred embodiment is an air conditioning compressor motor that requires a three phase power source to operate, however, other three phase motors are equally suitable for the operation of the present invention. The three phase source 102 is also utilized to supply power for the motor control circuit 100. In this prior art configuration, only two main power legs, L1 and L2, 106 and 108, are necessary to power the motor control circuit 100.

The motor control circuit 100 controls the application of three phase power to the air conditioning compressor motor 104. The motor control circuit 100 includes control contact points 116 for electronically controlling the provision of power from the three phase power source 102 to the air conditioning compressor motor 104. Specifically, the three phase motor control circuit 100 contains a stepdown transformer coil 112 operable to convert the incoming high transmission voltages from L1 and L2, 106 and 108 respectively, of the three phase power source 102 into lower voltages for control power 114 that governs the operation of the control contact points 116. Typically, the incoming transmission voltages will be either 208, 240 or 480 volts and the stepdown transformer coil 112 will be configured to produce a secondary voltage of 24 volts. The 24 volt secondary voltage is ideal for operating the control contact points 116, but the control power 114 can be adjusted depending on various application requirements.

The critical aspect of the prior art three phase power supply system is, as noted above, that L3 110 is not utilized to power the motor control circuit 100 for the operation of the control contact points 116. Therefore, one third of the main power leg loss conditions that can result in "single phasing", or power surges that may result in load 104 burn out, cannot be detected by the prior art three phase power supply system configuration in FIG. 1. It will be described hereinafter that a more advantageous modified configuration can be achieved by utilizing all three main power legs to operate the control contact points 116, thereby allowing the motor control circuit 100 to monitor for all three main power legs, particularly the presence of L3 110. It will become apparent that the power to the air conditioning compressor motor 104 is not affected by the modified three phase motor control circuit 100, but the system represents a safety improvement that guards against burnout and overload conditions without the added complexity of additional components or control systems. The response time of this configuration is a significant improvement over more complex control circuit methods.

Figure 2A:
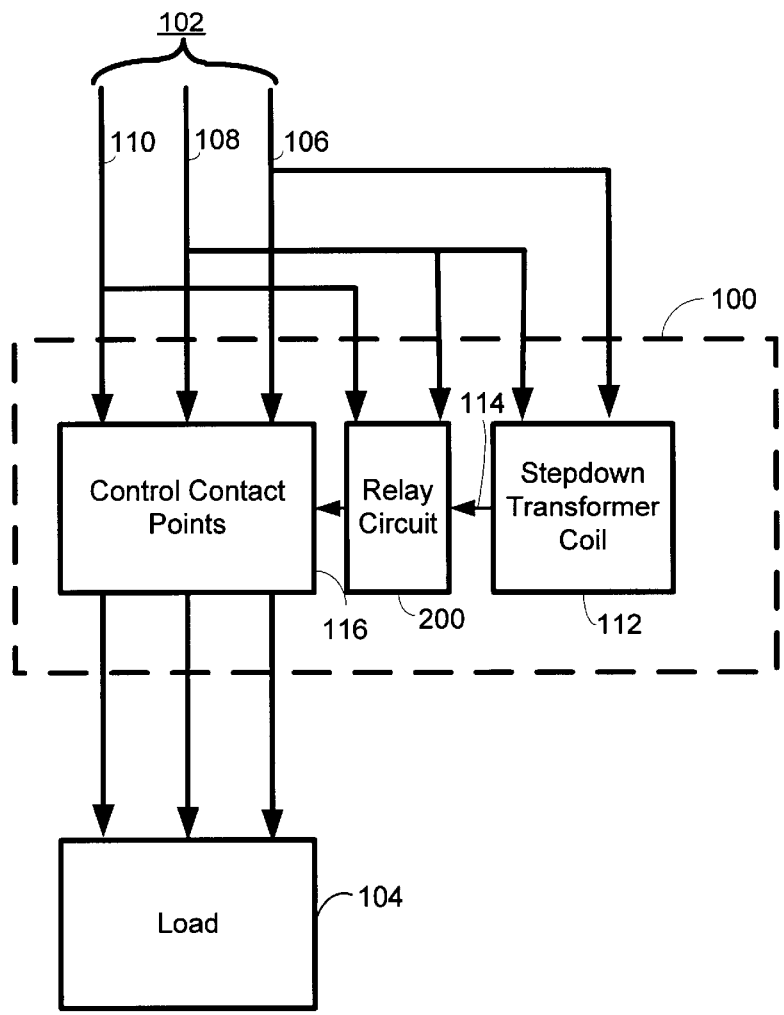
FIG. 2A is a block diagram illustrating a modified three phase power supply system according to the present invention.

FIG. 2A is a block diagram illustrating a modified three phase power supply system according to the present invention. The modified three phase power supply system includes the motor control circuit 100, the three phase power source 102 and the load 104 as shown in FIG. 1. The present invention adds a relay circuit 200 to the motor control circuit 100 that at least requires L3 110 to enable control power 114 to pass to the control contact points 116 from the stepdown transformer coil 112. Therefore, in conjunction with the two main power legs utilized to supply power to the stepdown transformer 112, all three main power legs must be present in order for the motor control circuit 100 to allow three phase power from the three phase power source 102 to pass to the air conditioning compressor motor 104.

Figure 2B:
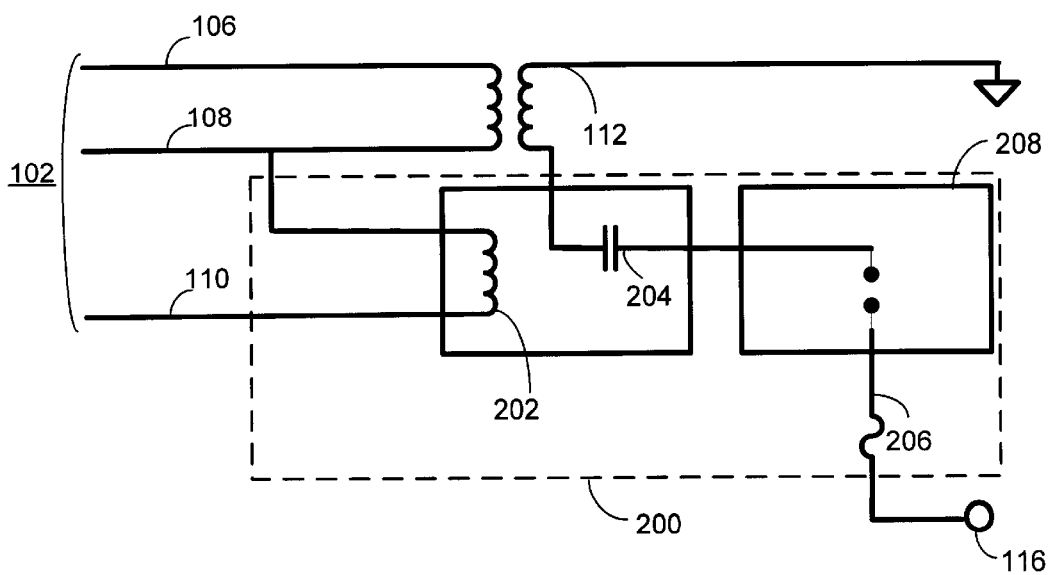
FIG. 2B is a circuit diagram illustrating a preferred embodiment of the present invention implementing a modified motor control circuit.

FIG. 2B is a circuit diagram illustrating a preferred embodiment of the present invention implementing a modified motor control circuit. In this preferred embodiment of the present invention, the relay circuit 200 includes a power coil 202 and a set of relay contact points 204 to provide a gate for controlling the flow of control power 114 between the stepdown transformer coil 112 and the control contact points 116. Therefore, according to the present invention, the motor control circuit 100 is configured so that no power will reach the air conditioning compressor motor 104 in the absence of any of the main power phases supplied by the three phase power source 102. The relay circuit 200 utilizes L3 110 and L2 108 in this preferred embodiment to power the power coil 202 and relay contact points 204, the operation of which are described in detail below. This modification ensures that all three main power legs must be operating in order for control power 114 to reach the control contact points 116.

Accordingly, the modified motor control circuit 100 must receive power from all three main power legs to operate. The modified motor control circuit 100 consists of a power coil 202, the stepdown transformer coil 112, and relay contact points 204 located on the load side of the stepdown transformer coil 112 that are powered by the power coil 202 and operable to shut down control power 114 from reaching the control contact points 116. Put succinctly, all three main power legs (L1, L2, L3) from the three phase power source 102 are used to control the motor control circuit 100 and thus, must all be operating for power to reach the air conditioning compressor motor 104. L1 and L2, 106 and 108 respectively, power the stepdown transformer coil 201 and L2 and L3, 108 and 110 respectively, supply power to the power coil 202. When the power coil 202 is active, the relay contact points 204 close the circuit on the load side of the stepdown transformer coil 112 and allow the normal flow of control power 114. In the event of a main power leg loss, in particular the loss of L3 110, the power coil 202 will not be active and the relay contact points 204 will create an open circuit on the load side of the stepdown transformer coil 112, preventing control power 114 from reaching the control contact points 116.

The operation of the modified motor control circuit 100 can be described by its response to various fault conditions. If L1 106 loses power, the stepdown transformer coil 112 will not generate control power 114. Thus, the air conditioning compressor motor 104 will shut down and be protected from power surges until L1 106 regains transmission power. If L2 108 loses power, the stepdown transformer coil 112 will not provide a control power 114 useful for the control contact points 116 to close, similar to the shutdown that occurs at the loss of L1 106, and the power coil 202, sensitive to L2 108 and L3 110, will not relay control power 114 to the relay contact points 204, again causing control power to shutdown. Although the stepdown transformer coil 112 will not produce control power 114 when L2 108 is lost, the relay circuit 200 shutdown will add the feature of redundancy to the motor control circuit 100. If L3 110 loses power, the power coil 202 will not relay control power 114 to the relay contact points 204, thereby causing the control contact points 116 to open and the air conditioning compressor motor 104 to shut down until L3 110 regains transmission power.

In the event of a main power leg loss, a fuse 206 located on the load side of the stepdown transformer coil 112 and, in the preferred embodiment, electronically disposed between the relay circuit 200 and the control contact points 116, breaks the circuit when a fault condition occurs as an additional safety precaution to prevent control power 114 surges from damaging the control contact points 116. A time delay 208 on the load side of the stepdown transformer coil 112, preferably electronically disposed between the relay contact points 204 and the fuse 206, provides protection to the air conditioning compressor motor 104 from the motor control circuit 100 allowing three phase power to surge on or off too abruptly when main power legs drop in or out.

In summary, the modified three phase motor control circuit 100 consists of basic three phase power supply components, namely the stepdown transformer coil 112, the relay circuit 200 and the control contact points 116, and is operable to protect an air conditioning compressor motor 104, or any other three phase device, from loss of L3 110. All three legs of main power (L1, L2, and L3) are used to operate the motor control circuit 100 and thus, must all be operating for three phase power to reach the air conditioning compressor motor 104. Main power legs L1 and L2, 106 and 108 respectively, supply power to the stepdown transformer coil 112 and main power legs L2 and L3, 108 and 110 respectively, supply power to the either 208, 240, or 480 volt power coil 202. When the power coil 202 is active, the relay contact points 204 close the circuit on the load side of the stepdown transformer coil 112 and allow the normal flow of control power 114. In the event of a leg loss (L2 or L3), the power coil 202 will not be active and the relay contact points 204 will create an open circuit on the load side of the stepdown transformer coil 112 shutting down the control power 114. A fuse 206 on the load side of the stepdown transformer coil 112 breaks the circuit when a power surge fault condition is present. A time delay 208 on the load side of the stepdown transformer coil 112, electronically disposed between the relay circuit 200 and the fuse 206, provides protection to the air conditioning compressor motor 104 from power surging on or off or phases dropping in or out too abruptly.

The modified motor control circuit successfully prevents power from a three phase power source from reaching an air conditioning compressor motor when L3 is not operating. The present invention describes a three phase power supply system that does not include complex circuitry and circuit logic that inherently creates a time delay between the occurrence of a fault condition and the power shut off response. The present invention is an improved solution for protecting power sensitive three phase loads, such as building air conditioning compressor motors, because it is able to shut down supply power when any one of the three main power legs is lost. Finally, the present invention is economically packaged and designed to be incorporated into existing three phase power supply systems and other applications that have physical space limitations. The present invention is particularly advantageous because it is not necessary to modify or add significant new components on to existing motor control circuits in order to implement the improvements.

The present invention has been described in relation to particular embodiments, which are intended in all respects to be illustrative rather than restrictive. Those skilled in the art will understand that the principles of the present invention may be applied to, and embodied in, various program modules for execution on differing types of computers and/or equipment, operating in differing types of networks, regardless of the application.

Alternate embodiments will become apparent to those skilled in the art to which the present invention pertains without departing from its spirit and scope. Accordingly, the scope of the present invention is described by the appended claims and supported by the foregoing description.

I claim:

1. An improvement for a motor control circuit having a stepdown transformer coil powered by a first and second main power leg for producing a control power for a set of generally open control contact points, said control contact points operable to control the supply of three phase power from a three phase power source, having first, second and third main power legs, to a load, said improvement comprising:

a relay circuit electronically disposed between said stepdown transformer coil and said control contact points, said relay circuit enabling said control power to pass to said control contact points from said step down transformer coil when said third main power leg is present.

2. The improvement of claim 1, wherein said relay circuit comprises a power coil and a set of generally open relay contact points for controlling the supply of said control power from said stepdown transformer coil to said control contact points.

3. The improvement of claim 1, wherein said relay circuit is powered by said second and third main power legs of said three phase power source.

4. A three phase power supply system having a three phase power source having first, second and third main power legs for supplying power to a load and a motor control circuit having a stepdown transformer coil powered by said first and second main power legs for producing a control power to close a set of generally open control contact points, comprising:

a relay circuit electronically disposed between said stepdown transformer coil and a said control contact points, said relay circuit enabling said control power to pass to said control contact points from said step down transformer coil when said third main power leg is present.

5. The system of claim 4, wherein said stepdown transformer coil is a 240:24 volt stepdown transformer coil.

6. The system of claim 4, wherein said stepdown transformer coil is a 480:24 volt stepdown transformer coil.

7. The system of claim 4, wherein said relay circuit comprises a power coil and a set of generally open relay contact points for controlling the supply of said control power from said stepdown transformer coil to said control contact points.

8. The system of claim 7, wherein said relay circuit is powered by said second and third main power legs of said three phase power source.

9. The system of claim 7, wherein said power coil is utilized to close said relay contact points.

10. A method for main power leg loss protection for a three phase power source having first, second and third main power legs, comprising:

converting a transmission power from said first and second main power legs into a control power utilizing a stepdown transformer coil;

relaying said control power from said stepdown transformer coil to a set of generally open contact points; and closing said generally open contact points utilizing a power coil when said third main power leg is present.

* * * * *